No. 752,998. PATENTED FEB. 23, 1904.
M. P. OSBOURN.
DEVICE FOR CONTROLLING THE SUPPLY OF STEAM TO FEED WATER HEATERS.
APPLICATION FILED AUG. 1, 1903.
NO MODEL.
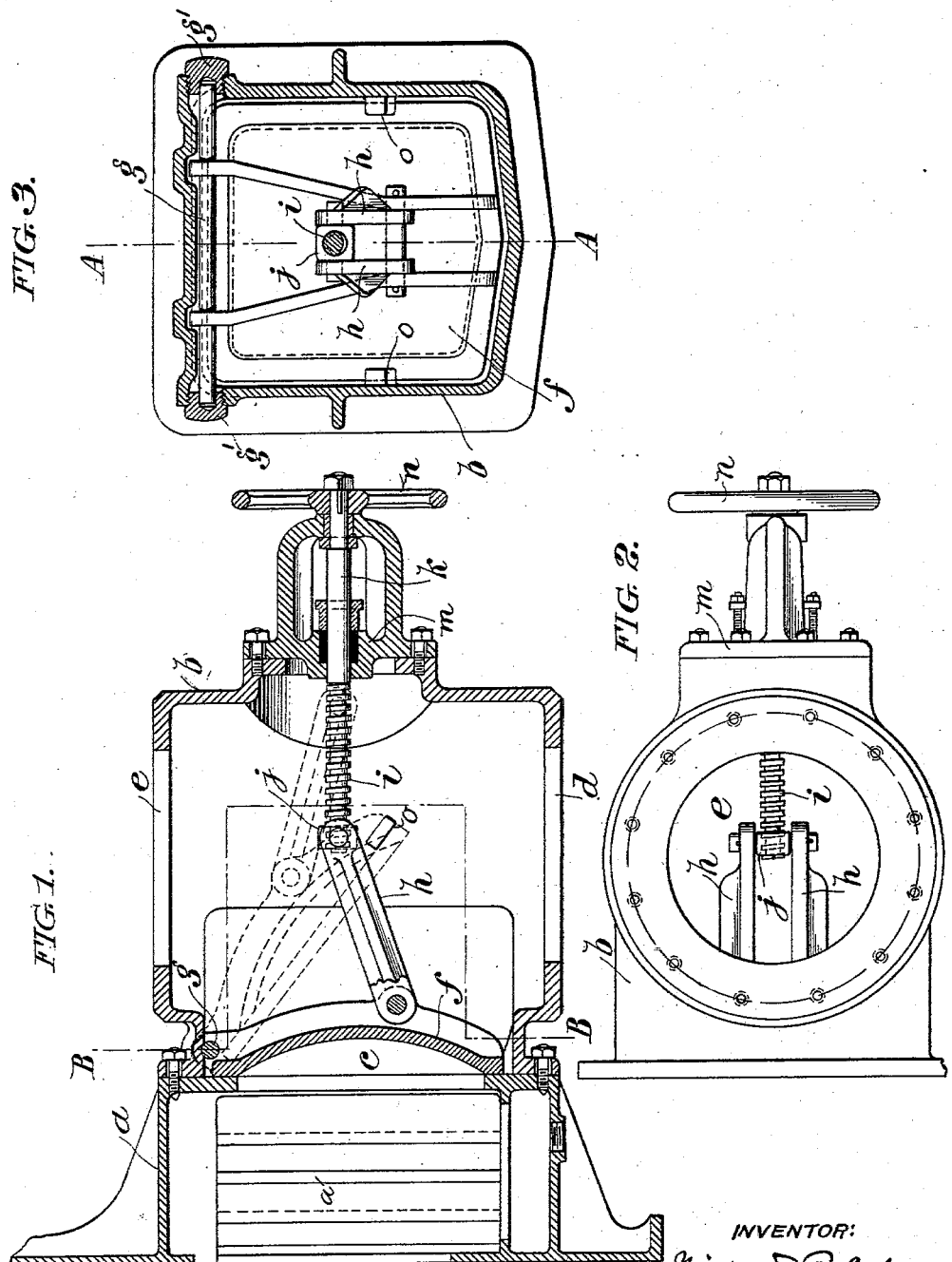

No. 752,998. Patented February 23, 1904.

UNITED STATES PATENT OFFICE.

MILLARD P. OSBOURN, OF MERCHANTVILLE, NEW JERSEY, ASSIGNOR TO WARREN WEBSTER AND COMPANY, A CORPORATION OF NEW JERSEY.

DEVICE FOR CONTROLLING THE SUPPLY OF STEAM TO FEED-WATER HEATERS.

SPECIFICATION forming part of Letters Patent No. 752,998, dated February 23, 1904.

Application filed August 1, 1903. Serial No. 167,810. (No model.)

*To all whom it may concern:*

Be it known that I, MILLARD P. OSBOURN, of Merchantville, county of Camden, and State of New Jersey, have invented an Improvement in Devices for Controlling the Supply of Steam to Feed-Water Heaters, of which the following is a specification.

More particularly, my invention is an attachment for feed-water heaters for the purpose of controlling the steam-supply to the heater-inlet.

My attachment enables the heater-inlet to be connected with the exhaust-pipe in a very simple manner and without the use of special fittings. It also obviates the use of the usual gate-valve in the heater-inlet.

The atttachment is simple in construction and easily operated and places the steam-supply to the heater under perfect control.

In the drawings, Figure 1 is a longitudinal vertical sectional view of my improved steam-supply valve for feed-water heaters. Fig. 2 is a plan view of the same, and Fig. 3 is a transverse vertical section on the line B B of Fig. 1.

$a$ is the usual exhaust-steam inlet of a feed-water heater having the baffles $a'$.

$b$ is a hollow casing which is bolted to the body of the inlet $a$, with which it communicates through an inlet-opening $c$. The casing is also provided with an inlet-opening $d$ for exhaust-steam and with an outlet-opening $e$ to the atmosphere or heating apparatus.

$f$ is a gate or door adapted to control the inlet-opening $c$ to the heater-inlet $a$. This door is pivoted on one side by a pin $g$, fitted in bearings $g'$, screwed into the walls of the casing $b$, and is connected by a link or links $h$ with a threaded spindle $i$, which engages a threaded nut $j$, swiveled in the ends of the links. The spindle $i$ is provided with a shank $k$, journaled in a stuffing-box $m$, bolted to the casing $b$, and the shank is provided with a hand-wheel $n$, by which it may be turned. By turning the hand-wheel $n$ the threaded spindle $i$ is turned in the nut $j$, thus moving the links and opening or closing the door $f$.

When the heater is in use, the door is opened to the position shown in dotted lines in Fig. 1. Stops $o$ are provided on the inside walls of the casing $b$ to prevent the door being so widely opened as to obstruct the passage through the casing $b$. With the door in this partially-opened position, the steam entering the casing through the inlet $d$ is partially deflected by the door and passes through the inlet-opening $c$ into the heater-inlet $a$. The surplus steam escapes around the door to the outlet $e$.

The door $f$ may be opened to a greater or less extent to suit the amount of steam required and the pressure of the supply.

When the heater is out of use, the door $f$ is closed and all of the steam passes freely through the casing $b$ and through the outlet $e$ to the atmosphere to heating apparatus.

What I claim as new, and desire to secure by Letters Patent, is as follows:

1. The combination with the inlet of a feed-water heater, of a casing secured thereto and provided with inlet and outlet openings for the passage of exhaust-steam and also with an opening communicating with the supply-opening of the heater-inlet, a hinged door in said casing controlling the supply-opening to the heater-inlet, a threaded spindle journaled in said casing, links carried by said door, and a threaded nut engaging said threaded spindle and journaled in said links.

2. The combination with the inlet of a feed-water heater, of a casing secured thereto and provided with inlet and outlet openings for the passage of exhaust-steam and also with an opening communicating with the supply-opening of the heater-inlet, a hinged door in said casing controlling the supply-opening to the heater-inlet, a threaded spindle journaled in said casing, links carried by said door, a threaded nut engaging said threaded spindle and swiveled in said links, and a limit-stop within said casing to limit the extent to which the door may be opened.

3. The combination with the casing $b$ adapted for attachment to the inlet of a feed-water heater having inlet and outlet openings for the passage of steam and a third supply-opening to supply steam to the heater-inlet, a hinged door in said casing for controlling said third supply-opening, and means carried by the casing for opening and closing said door from the exterior.

4. The combination with the casing *b* adapted for attachment to the inlet of a feed-water heater having inlet and outlet openings for the passage of steam and a third supply-opening to supply steam to the heater-inlet, a hinged door in said casing for controlling said third supply-opening, means carried by the casing for opening and closing said door from the exterior, consisting of a threaded spindle journaled in the casing, a swivel-nut engaging said threaded spindle and a link connection between said swivel-nut and the door.

5. The combination with the casing *b* adapted for attachment to the inlet of a feed-water heater having inlet and outlet openings for the passage of steam and a third supply-opening to supply steam to the heater-inlet, a hinged door in said casing for controlling said third supply-opening, means carried by the casing for operating said door from the exterior and a link connection between said door and means for operating it.

6. The combination with the casing adapted for attachment to the inlet of a feed-water heater, having inlet and outlet openings for the passage of steam and a third opening for supplying steam to the heater-inlet, a door to control said third opening having a hinge-pin, removable bearings for said hinge-pin carried by the casing, and means for opening and closing said door from the exterior of said casing.

In testimony of which invention I hereunto set my hand.

MILLARD P. OSBOURN.

Witnesses:
    F. J. MILLER,
    L. T. CARSON.